États-Unis Patent Office 3,518,243
Patented June 30, 1970

3,518,243
SULFONATED DERIVATIVES OF A GLYCOPEP-
TIDE EXTRACTED FROM ANIMAL ORGANS,
USEFUL AS DRUGS AND A PROCESS FOR THE
PREPARATION THEREOF
Adriano Butti, Tavernola, Como, Giuseppe Prino, Milan,
and Gianfranco Bertellini, Maslianico, Como, Italy, as-
signors to Prephar Prospection de Recherches Pharma-
ceutiques S.A., Schaffhausen, Switzerland, a Swiss
corporation
No Drawing. Continuation-in-part of application Ser. No.
705,915, Feb. 16, 1968. This application July 28, 1969,
Ser. No. 845,574
Claims priority, application Italy, Feb. 23, 1967,
13,002
Int. Cl. A61k 17/00; C07g 7/00
U.S. Cl. 260—112
26 Claims

ABSTRACT OF THE DISCLOSURE

Process for sulfonating glycopeptides of animal origin with a sulfonating agent in a heterocyclic tertiary base solvent. Resulting sulfonated product can be converted to corresponding ammonium or metal salts. The salts have pharmaceutical activity, particularly as anti-inflammatory agents.

RELATED APPLICATIONS

This application is a continuation-in-part of application Ser. No. 705,915, filed Feb. 16, 1968, and now abandoned. Application Ser. No. 583,070, filed Sept. 29, 1966, describes extraction of glycopeptides from certain animal organs.

BACKGROUND OF THE INVENTION

The invention has to do with a process for forming certain sulfonated glycopeptides and to the products as pharmaceuticals.

In copending application Ser. No. 583,070, filed Sept. 29, 1966, the extraction from some animal organs of glycopeptides which are useful as drugs has been disclosed and the main physical and chemical characteristics of said substances have been reported therein. It has now been found that the glycopeptides can be sulfonated to their corresponding sulfonate derivatives.

The above-mentioned sulfonate derivatives have proved to be useful as drugs, generally in the treatment of inflammatory diseases and particularly in the treatment of arthroses and of gastric ulcers, as well as being useful as cicatrizing and fibrinolysis control agents.

SUMMARY OF THE INVENTION

In accordance with the present invention, there is provided a process for preparing a sulfonated product of a glycopeptide obtained from the gastric mucosa or duodenum of swine. The process comprises hydrolyzing the animal organ in water, removing acidic hydrolysis byproducts, diluting the remaining and desired product with a non-solvent therefor, suspending the diluted product in a heterocyclic tertiary base, contacting the resulting suspension with a sulfonating agent, and recovering the resulting sulfonated product.

SPECIFIC EMBODIMENTS

Extraction

Extraction of the gastric mucosa or duodenum of swine to obtain glycopeptides is described in application Ser. No. 583,070 and the description of said application is incorporated herein by reference. Briefly, the animal organ or organs are hydrolyzed in water at a temperature of from about 50° C. to about 100° C. for from about 10 minutes to about 45 minutes at a pH of from about 1 to about 10. Acidic hydrolysis by-products are then removed from the hydrolysis product, and the remaining and desired product is then diluted with a non-solvent therefor.

At the end of the hydrolysis stage, it may be convenient to effect the precipitation of all of the organic substances having acidic character such as, for example, the sulfur-containing mucopolysaccharides. Hence, if the hydrolysis has been conducted at an alkaline pH, the mixture can be brought again to an acidic pH by adding a weak acid (e.g. acetic acid) whereby causing the precipitation of these substances. The filtrate is then freed from the proteic drosses by treatment with an enzyme (e.g. papain or trypsin) in a proper pH (from 5.5 to 6.5) condition. It can also be convenient to effect, before the enzymatic treatment, a preliminary precipitation of most of the proteic drosses by adding a suitable reactant, such as, for example, trichloroacetic acid. By diluting the filtrates obtained from these treatments with organic solvents (alcohol or acetone), the raw glycopeptide is obtained in the form of a white to hazel powder. The products contain only a trace of sulfur and are characterized by the absence of uronic acids. Hexosamines are present in the range of 40–50%, amino acids 13–18% and hexoses 27–31%, by weight.

The above analytical data permits that the products be classed among the glycopeptides, while, on the other hand, the presence of hexosamines not accompanied by uronic acids and the absence of sulfur-containing groupings of all kinds, confer a characteristic feature upon the polysaccharidic moiety of this substance.

Sulfonation

The glycopeptide obtained as described in application Ser. No. 583,070 is suspended in a heterocyclic tertiary base having a boiling point of from about 100° C. to about 200° C. Typical bases include pyridine, methyl pyridines, ethyl pyridines, and dimethyl pyridines. Anhydrous pyridine is preferred. The glycopeptides are insoluble in the latter such that they are in suspension therein.

Suitable sulfonating agents include chlorosulfonic acid, sulfuric acid, oleum and adducts of sulfuric anhydride and organic compounds such as pyridine and dioxane.

Sulfonation is effected by bringing the glycopeptide suspension and the sulfonating agent together at a temperature from about −40° C. to about 0° C., and then contacting the same at a temperature from about 50° C. to about 80° C., and preferably at about 75° C., for from about 4 to about 8, and preferably about 5, hours. The quantity of sulfonating agent can be varied from about 400 to about 600, and preferably about 500, percent by weight of the glycopeptide.

At the end of the sulfonation reaction, the sulfonate product is collected by filtration and the impurities of basic or acidic nature are removed by dialysis or by treatment with ionic exchange resins.

Sulfonate Salts

The sulfonate glycopeptide (which hereinafter will be also indicated as SGLP) is then converted to a corresponding sodium salt with sodium hydroxide, and the sodium salt is precipitated by dilution of its water solution with suitable solvents, as acetone or methanol. In another aspect of the invention, the SGLP is converted to other salts with other alkaline metals or ammonia, or earth-alkaline metals or heavy metals.

The salts of the SGLP are obtained from the same SGLP originating from the sulfonation reaction, through neutralization with an alkaline or earth-alkaline metal hydroxide or ammonium hydroxide, as well as from the SGLP sodium salt by double exchange with an earth-alkaline or heavy metal salt.

Salts obtained through SGLP neutralization with a metal hydroxide are isolated by treating the aqueous solution with a precipitating agent as acetone or methanol. It has been found that particularly favorable results are obtained when before the precipitation a small amount of from about 3 to about 7 percent by weight, based upon the weight of the hydroxide, is added of an acetate or halide of the same metal whose hydroxide was employed for SGLP neutralization. Metals which are most suitable for this embodiment are potassium, lithium, calcium, barium, strontium and ammonium.

Double exchange reaction between SGLP sodium salt and salts of other metals is carried out in an aqueous solution, the anion of the salt under consideration being constituted preferably of an acetate or of a halide. Double exchange reaction may be carried out also by percolating an aqueous solution of SGLP sodium salt through a column of strongly cationic exchange resin which was previously salified with the metal whose salt is to be obtained. The percolated solution is then treated with a precipitating agent, as acetone or methanol, preferably after addition of a minor amount of an acetate or halide of the same metal whose salt is desired as mentioned above. Particularly suitable for this double exchange reaction are the following metals: zinc, calcium, barium, strontium, copper, nickel, cobalt, magnesium, bismuth, gold and aluminum.

In the following table some analytical values are reported which are characteristic for the sodium salt of SGLP prepared as above, corresponding to materials with the lowest and highest sulfonation degree:

|  | Percent |
|---|---|
| S | 3.7–14.5 |
| C | 42.5–22.7 |
| H | 6.65–3.55 |
| O | 39.15–45.65 |
| N | 5.35–3.0 |
| Na | 2.68–10.6 |
| Hexosamines | 31.7–18 |
| Hexoses | 24.7–14 |
| $CH_3CO$ | 8.28–4.7 |
| Proteins | 14.2–8.8 |
| Uronic acids | None |

The proteic component has the following composition percentage (by weight):

| | |
|---|---|
| Aspartic acid | 2.18 |
| Threonine | 33.68 |
| Serine | 10.62 |
| Glutamic acid | 5.87 |
| Proline | 22.96 |
| Glycine | 2.49 |
| Alanine | 5.36 |
| Valine | 5.16 |
| Isoleucine | 1.46 |
| Leucine | 4.25 |
| Lysine | 2.02 |
| Hystidine | 2.13 |
| Arginine | 1.82 |

In the tests performed on laboratory animals the glycopeptide sulfonated derivatives have proved to be active in the following:

(a) Inhibition of the local oedema in the rat paw caused by carrageenin, serotonine and kaolin; the acitivity shows itself already at 3.25 mg./kg., endoperitoneallyns;

(b) Inhibition of intradermic wheals at 12.5 mg./kg., endoperitoneallyn;

(c) Increase of the functional recovery rate of the limb with arthritis by $AgNO_3$, at 12.5 mg./kg., endoperitoneally;

(d) Increase of the cicatrization rate of experimental wounds at 6.25 mg./kg., endoperitoneally and at 12.5 mg./kg. subcutaneously;

(e) Inhibition of the ulcer by pylorus ligature and by hydrocortisone, at 12.5 mg./kg. endoperitoneally and at 50 mg./kg. orally;

(f) Decrease of the peptic acitivity of the gastric juice either "in vivo" or "in vitro";

(g) Increase of the fibrinolytic acitivity as determined by the methods of the euglobulin lysis time, of the fibrine plates according to Astrup and theromboelastographic; said activity shows itself at 500 gamma/kg.;

(h) Decrease of the cholesterol and of the plasmatic triglycerides, after prolonged treatment in the rat.

No toxicity proof was evidenced in rats and mice after a single treatment with 3 g./kg. orally, or prolonged administration for 6 months with 100 mg./kg./day.

The following examples illustrate the invention, although they have no limiting character:

EXAMPLE 1

One gram of extractive glycopeptide obtained as described in Example 5 of application Ser. No. 583,070, filed on Sept. 29, 1966 is suspended in 20 ml. anhydrous pyridine. The solution is cooled while stirring at −15° C. and is treated slowly with 5.3 g. of chlorosulfonic acid. After carrying out the addition, the reaction is completed by heating for 6 hours at 60° C., then it is allowed to cool and the resulting precipitate is collected by filtration and then washed with methanol. The product is afterwards dissolved in 50 ml. water and the resulting solution is brought to pH 10 by adding 1 normal NaOH, filtered again, the pH of the filtrate is adjusted to 6 by adding acetic acid, and the solution is dialyzed for 48 hours against distilled water at room temperature, with a regenerated cellulose diaphragm.

At the end of the dialysis operation, the solution is filtered and the filtrate is lyophilized.

Yield: 0.900 gram.

Analysis: S=4.8%; N=5.15%; Na=3.46%; hexosamines=30.4%; hexoses=23.6%; uronic acids=none; acetyl groups=7.95%; proteins=13.5%.

EXAMPLE 2

One gram of the extractive glycopeptide mentioned in Example 5 is suspended in 20 ml. of anhydrous pyridine. The suspension is cooled at −40° C. while it is stirred and is slowly treated with 5.3 g. of chlorosulfonic acid. After carrying out the addition, the reaction is brought to completion by heating the reaction mixture for 6 hours at 60° C., then it is allowed to cool and the resulting precipitate is collected by filtering. The precipitate is dissolved in 50 ml. water, the product is precipitated by diluting with methanol (150 ml.) and collected again by filtration.

The last-mentioned precipitate is dissolved once more in water (50 ml.) and the solution is treated while stirred, for half an hour, with a mixture of ion exchange resins consisting of 25 ml. of IR–120 resin and 25 ml. of IRA 410 resin.

The resins are removed by filtration, the pH is adjusted to 6 by addition of 1 normal NaOH and the solution is concentrated under reduced pressure to a volume of 15 ml. The product is precipitated by dilution with 60 ml. methanol after adding to the solution 0.5 g. hydrated sodium acetate. The precipitation is collected on a filter, washed with methanol, then with ether and dried in vacuum upon $P_2O_5$.

Analysis: S=3.7%; N=5.35%; Na=2.68%; hexosamines=31.7%; hexoses=24.7%; uronic acids=none; acetyl groups=8.28%; proteins=14.2%.

EXAMPLE 3

2 g. of the extractive glycopeptide mentioned in Example 5 are suspended in 40 ml. of anhydrous pyridine. The suspension is cooled at −20° C. and treated slowly while stirred with 10.6 g. of chlorosulfonic acid. After carrying out the addition, the reaction is brought to completion by heating for one hour while stirring and for two hours without stirring at a temperature of 65° C. The solvent is decanted and the resulting gel-like precipitate is taken up again with methanol, then collected on a filter. The product is dried under vacuum at 50° C., dissolved in water (50 ml.) and treated while stirring with 25 ml. of ion exchange resin IR–120 for 30 minutes. The resin is removed by filtration and the filtrate undergoes the same treatment with 25 ml. of exchange resin IRA–410. The latter resin is removed by filtration and the pH of the solution is adjusted to 11 by means of 1 normal NaOH addition. The filtrate is brought to pH 6.5 by treating it with 2 normal $CH_3COOH$, then 0.2 g. of hydrated sodium acetate is added, the liquor is concentrated under reduced pressure to a volume of 20 ml. and the product is precipitated by dilution with 80 ml. of methanol.

The product is collected on a filter, washed with alcohol and ether, then dried in vacuum at 50° C.

Yield: 3 g.

Analysis: S=14.65%; N=3.05%; Na=10.63%; hexosamines=18%; hexoses=14%; uronic acids=none; acetyl groups=4.7%; proteins=8.8%.

EXAMPLE 4

An extractive glycopeptide is subjected to sulfonation according to one of the Examples 1–3.

An aqueous solution of the acidic sulfonated glycopeptide, as it obtained from working out the reaction mixture, is adjusted to pH 6 with barium hydroxide. Then it is concentrated under reduced pressure to a volume of 15 ml., 0.5 g. of $BaCl_2$ is added and it is diluted again with 60 ml. of methanol to obtain a precipitate constituted of the sulfonated glycopeptide barium salt.

Analysis: Ba=23.95%; S=10.67%.

EXAMPLE 5

10 g. of a sulfonated glycopeptide sodium salt (S=13.6%)

obtained as described in Example 3, are dissolved in 100 ml. of water and treated with an aqueous solution of 1 normal zinc acetate. Then, it is diluted with 400 ml. of methanol to obtain a precipitate constituted of the sulfonated glycopeptide zinc salt.

Analysis: Zn=8.9%; S=11.70%.

EXAMPLE 6

55 ml. of strongly cationic exchange resin, Amberliter IR–120, which has been activated by known methods, one liter of 1% $AlCl_3 \cdot 6H_2O$ solution is percolated within is charged to an 80 cm. high glass column, wherethrough about one hour.

The column is subsequently thoroughly washed by allowing 500 ml. distilled water to flow therethrough within half an hour.

Through the said column, a solution is then passed which contains 20 g. of sulfonated glycopeptide sodium salt (obtained as in Example 3; S=13.6%), in 800 ml. of distilled water within about 4 hours.

The column is then washed with 500 ml. of distilled water, then the washing waters and the previously obtained eluates are combined. The solution is concentrated under reduced pressure to a volume of 600 ml.; 0.5 g.

$AlCl_3 \cdot 6H_2O$ are added and it is diluted with 1200 ml. of acetone to obtain a precipitate constituted of the sulfonated glycopeptide aluminum salt.

Analysis: Al=3.5%; S=11.22%.

EXAMPLE 7

100 g. of a sodium salt of glycopeptide sulfonate (14% S), prepared as described in Example 3, were dissolved in 1000 ml. of lukewarm water and poured into 1000 ml. of a ⅓ molar bismuth nitrate solution in glacial acetic acid.

Then 2000 ml. of methanol (1 volume) were added. The resulting precipitate was centrifuged and washed three times by crushing it in 1500 ml. of a 3:1 methanol-glacial acetic acid mixture and centrifuging it each time. Then the precipitate was washed again three times in the same manner using 1500 ml. of acetone each time. The powder (128 g.) which was obtained was dried in vacuo and then dissolved again in 15 volumes of water (1920 ml. to obtain an acid solution (pH 4.5). An aqueous 1 normal caustic soda solution was added to provide a solution having a pH of 6.5, and then a precipitate was obtained by adding 1.5 volumes of acetone to the solution.

The precipitate was centrifuged and washed three times with a 2:1 acetone-water mixture, centrifuging it each time, and then it was washed three times with acetone.

Finally, the precipitate was dried in vacuo to give 120 g. of product.

Analysis: S=8%; Bi=29%.

EXAMPLE 8

A gold salt corresponding to the bismuth salt in Example 7 was prepared by following the procedure of the latter example, with the exception of using a 0.3 auric nitrate solution in glacial acetic acid.

By proceeding analogously to the procedures described in the illustrative examples, the following SGLP salts are obtained:

Magnesium salt of the sulfonated glycopeptide:
 Analysis: Mg=4.0%; S=12.07%
Cobalt salt of the sulfonated glycopeptide:
 Analysis: Co=7.85%; S=11.28%
Nickel salt of the sulfonated glycopeptide:
 Analysis: Ni=8.0%; S=11.13%
Copper salt of the sulfonated glycopeptide:
 Analysis: Cu=7.9%; S=11.5%
Calcium salt of the sulfonated glycopeptide:
 Analysis: Ca=7.05%; S=12.7%.

What we claim is:

1. A process for preparing a sulfonated product of a glycopeptide from the gastric mucosa or duodenum of swine, comprising:
 (a) hydrolyzing the animal organ in water at a temperature from about 50° C. to about 100° C. for from about 10 minutes to about 45 minutes at a pH from about 1 to 10;
 (b) removing acidic hydrolysis by-products obtained by the hydrolysis of (a);
 (c) diluting the product of (b) with a non-solvent therefore whereby a glycopeptide is precipitated therefrom;
 (d) suspending the product of (c) in a heterocyclic tertiary base having a boiling point of from about 100° C. to about 200° C.;
 (e) contacting the resulting suspension of (d) with a sulfonating agent selected from the group consisting of sulfuric acid, oleum, chlorosulfonic acid and an adduct of sulfuric anhydride and an organic compound, at a temperature from about −40° C. to about 0° C. and then a temperature from about 50° C. to about 80° C., and recovering the resulting sulfonated product.

2. The process of claim 1 wherein the base of (d) is pyridine.

3. The process of claim 1 wherein the sulfonating agent of (e) is chlorosulfonic acid.

4. The process of claim 1 wherein the contact time with the sulfonating agent in (e) is from about 4 to about 8 hours.

5. The process of claim 1 wherein the sulfonated product formed in (e) is dialyzed.

6. The process of claim 1 wherein the sulfonated product formed in (e) is contacted with an ion exchange resin selected from the group consisting of an anionic, a cationic and a mixture of an anionic and a cationic exchange resin.

7. The process of claim 1 wherein the sulfonated product recovered in (e) is (f) reacted with a hydroxide selected from the group consisting of an alkali metal hydroxide, an alkaline earth metal hydroxide and ammonium hydroxide, whereby the sulfonated product is converted to its corresponding alkali, alkaline earth metal or ammonium salt, and the resulting product is (g) contacted with acetone or methyl alcohol whereby said salt is precipitated.

8. The process of claim 7 wherein a minor amount of an acetate or halide having the same cation as said hydroxide is dissolved in the acetone or methyl alcohol.

9. The process of claim 7 wherein the hydroxide of (f) is sodium hydroxide and the salt of (g) is a sodium salt.

10. The process of claim 9 wherein a solution of the said sodium salt is treated with a halide or acetate of a metal selected from the group consisting of zinc, calcium, barium, strontium, copper, nickel, magnesium, aluminum and cobalt, and precipitating the resulting metal salt with acetone or methyl alcohol.

11. The process of claim 9 wherein an aqueous solution of the said sodium salt is percolated through a cationic exchange resin having as a cation a metal selected from the group consisting of aluminum, zinc, magnesium, nickel, copper, calcium, barium, and cobalt, contacting the resulting percolated solution with a minor amount of an acetate or halide of said metal, and precipitating the resulting metal salt wih acetone or methyl alcohol.

12. The process of claim 1 wherein the non-solvent of (c) comprises from about 1 to about 3 volumes of acetone, methyl alcohol or ethyl alcohol, for each volume of the product of (b).

13. The process of claim 11 wherein the amount of acetate or halide is from about 3 to about 7 percent by weight.

14. A salt of a sulfonated glycopeptide of claim 1 the cation of which salt is selected from the group consisting of an alkali metal, an alkaline earth metal, a heavy metal and ammonium.

15. A salt of claim 14 wherein the cation is sodium.

16. A sodium salt of claim 15 having the following approximate composition in percent by weight:

| | |
|---|---|
| S | 3.7–14.5 |
| C | 42.5–22.7 |
| H | 6.65–3.55 |
| O | 39.15–45.65 |
| N | 5.35–3.0 |
| Na | 2.68–10.6 |
| Hexosamines | 31.7–18 |
| Hexoses | 24.7—14 |
| $CH_3CO$ | 8.28–4.7 |
| Proteins | 14.2–8.8 | and being substantially free of phosphorus and uronic acids.

17. A salt of claim 14 wherein the cation is calcium.
18. A salt of claim 14 wherein the cation is barium.
19. A salt of claim 14 wherein the cation is magnesium.
20. A salt of claim 14 wherein the cation is aluminum.
21. A salt of claim 14 wherein the cation is zinc.
22. A salt of claim 14 wherein the cation is copper.
23. A salt of claim 14 wherein the cation is nickel.
24. A salt of claim 14 wherein the cation is cobalt.
25. A salt of claim 14 wherein the cation is bismuth.
26. A salt of claim 14 wherein the cation is gold.

References Cited

FOREIGN PATENTS 1,099,036   1/1968   Great Britain.

WILLIAM H. SHORT, Primary Examiner

H. SCHAIN, Assistant Examiner

U.S. Cl. X.R.

424—104, 177